United States Patent
Wasserblat et al.

(10) Patent No.: US 8,676,586 B2
(45) Date of Patent: Mar. 18, 2014

(54) METHOD AND APPARATUS FOR INTERACTION OR DISCOURSE ANALYTICS

(75) Inventors: Moshe Wasserblat, Maccabim (IL); Oren Pereg, Amikam (IL); Yuval Lubowich, Raanana (IL)

(73) Assignee: Nice Systems LTD, Raanana (IL)

( * ) Notice: Subject to any disclaimer, the term of this patent is extended or adjusted under 35 U.S.C. 154(b) by 1095 days.

(21) Appl. No.: 12/211,112

(22) Filed: Sep. 16, 2008

(65) Prior Publication Data

US 2010/0070276 A1 Mar. 18, 2010

(51) Int. Cl.
*G10L 21/00* (2013.01)

(52) U.S. Cl.
USPC .......................................... 704/270; 704/278

(58) Field of Classification Search
None
See application file for complete search history.

(56) References Cited

U.S. PATENT DOCUMENTS

| | | | | |
|---|---|---|---|---|
| 5,396,542 A * | 3/1995 | Alger et al. | ................... | 379/67.1 |
| 5,642,520 A * | 6/1997 | Takeshita et al. | .................. | 704/3 |
| 6,151,571 A * | 11/2000 | Pertrushin | ...................... | 704/209 |
| 7,103,553 B2 * | 9/2006 | Applebaum et al. | .......... | 704/275 |
| 7,191,129 B2 * | 3/2007 | Brown et al. | .................. | 704/235 |
| 7,263,489 B2 * | 8/2007 | Cohen et al. | ................... | 704/270 |
| 7,451,089 B1 * | 11/2008 | Gupta et al. | ................ | 704/270.1 |
| 7,512,545 B2 * | 3/2009 | Knott et al. | ................... | 705/7.32 |
| 7,596,498 B2 * | 9/2009 | Basu et al. | ..................... | 704/270 |
| 7,664,641 B1 * | 2/2010 | Pettay et al. | ................... | 704/251 |
| 7,716,048 B2 * | 5/2010 | Pereg et al. | ................... | 704/246 |
| 7,739,115 B1 * | 6/2010 | Pettay et al. | .................. | 704/270 |
| 7,853,451 B1 * | 12/2010 | Gupta et al. | .................. | 704/257 |
| 7,885,813 B2 * | 2/2011 | Blair et al. | ..................... | 704/246 |
| 7,912,714 B2 * | 3/2011 | Kummamuru et al. | ....... | 704/245 |
| 7,996,214 B2 * | 8/2011 | Bangalore et al. | ............ | 704/207 |
| 8,000,963 B2 * | 8/2011 | Onodera et al. | ............. | 704/249 |
| 8,005,676 B2 * | 8/2011 | Duke et al. | ..................... | 704/254 |
| 8,209,182 B2 * | 6/2012 | Narayanan | .................... | 704/270 |
| 8,214,214 B2 * | 7/2012 | Bennett | ......................... | 704/254 |
| 2003/0078782 A1 * | 4/2003 | Blair | ......................... | 704/270.1 |
| 2003/0154072 A1 * | 8/2003 | Young et al. | ...................... | 704/9 |
| 2005/0246165 A1 * | 11/2005 | Pettinelli et al. | .............. | 704/207 |
| 2007/0071206 A1 * | 3/2007 | Gainsboro et al. | ........... | 379/168 |
| 2009/0006085 A1 * | 1/2009 | Horvitz et al. | ................ | 704/223 |
| 2010/0278377 A1 * | 11/2010 | Hamel et al. | ................... | 382/100 |

OTHER PUBLICATIONS

Stolcke et al., "Automatic linguistic segmentation of conversational speech", Proc. Intl. Conf. on Spoken Language Processing, vol. 2, pp. 1005-1008, 1996.*

Stolcke et al., "Dialogue Act Modeling for Automatic Tagging and Recognition of Conversational Speech", Computational Linguistics 26(3), 339-373, 2000.*

Shriberg, Elizabeth, et al. "Prosody-based automatic segmentation of speech into sentences and topics." Speech communication 32.1 (2000): 127-154.*

(Continued)

*Primary Examiner* — Brian Albertalli
(74) *Attorney, Agent, or Firm* — Soroker-Agmon (57) ABSTRACT

A method and apparatus for analyzing and segmenting a vocal interaction captured in a test audio source, the test audio source captured within an environment. The method and apparatus first use text and acoustic features extracted from the interaction with tagging information, for constructing a model. Then, at production time, text and acoustic features are extracted from the interactions, and by applying the model, tagging information is retrieved for the interaction, enabling analysis, flow visualization or further processing of the interaction.

25 Claims, 4 Drawing Sheets

(56) References Cited

OTHER PUBLICATIONS

Surendran, Dinoj, and Gina-Anne Levow. "Dialog act tagging with support vector machines and hidden Markov models." INTERSPEECH. 2006.*

Fernandez, Raul, and Rosalind W. Picard. "Dialog act classification from prosodic features using support vector machines." Speech Prosody 2002, International Conference. 2002.*

* cited by examiner

METHOD AND APPARATUS FOR INTERACTION OR DISCOURSE ANALYTICS

TECHNICAL FIELD

The present disclosure relates to speech recognition in general, and to a method and apparatus for interaction or discourse analytics, in particular.

BACKGROUND

Large organizations, such as commercial organizations, financial organizations or public safety organizations conduct numerous interactions with customers, users, suppliers or other persons on a daily basis. A large part of these interactions are vocal, or at least comprise a vocal component.

When an audio interaction captured within an organization is to be evaluated, inspected, analyzed or otherwise referred to without actually listening to the interaction. It is required to receive the text spoken within the interaction. Speech recognition, sometimes referred to as automatic speech recognition, computer speech recognition, speech to text, and others, converts spoken words and word sequences into machine-readable data. Speech recognition can take a number of forms. One form relates to free speech recognition, in which it is required to transcribe spoken text from audio stream or file, by one or more speakers, whether any of the speakers are known or not. Free speech recognition is used in applications such as dictation, preparation of structured documents such as radiology reports, and others. Another form relates to word spotting, in which predetermined words are searched for in audio sources such as files or streams, for applications such as voice dialing, voice-activation of devices, or the like.

However, speech recognition systems provide neither a hundred percent recall, i.e., not all words that were actually spoken are found, nor hundred percent precision, i.e., not all words allegedly found in the audio were indeed spoken. The obtained quality has significant impact on the usability of the text.

In addition, speech to text engines sometimes distort the output text, since they attempt to output a syntactically correct sentence, wherein if this requirement is relaxed there would be more correct words.

In addition, even if full transcription is available, the transcription itself does not provide the full flow of an interaction between two or more people, in which statements, questions, non-verbal segments and other conversation parts occur in no predetermined order.

Having the full flow of the interaction, for example by tagging different sections of the interaction as questions, answers or other segments, enables for better understanding of the interaction and the context. The interaction flow can be further useful in retrieving lexical features of the interaction, for purposes such as tagging lexical information, text mining systems, or the like. A segmented interaction can further be searched according to discourse segments, such as questions, statements or others, and can also be better utilized by analysis tools, visualization tools, and others. Additionally, having the flow of the interaction can help improve speech to text quality, for example by associating question words with question segments, thus improving the accuracy and reducing search time.

There is thus a need in the art for a method and apparatus for discourse analysis, which will enable retrieval of information about the interaction flow and lexical features of the interaction, improve speech to text performance, and enable usage of advanced analysis or visualization tools.

SUMMARY

A method and apparatus for analyzing interactions captured in an environment, by segmenting the interaction.

One aspect of the disclosure relates to a method for analyzing a vocal interaction captured in an audio source within an organization, the method comprising: a first receiving step for receiving a test audio source comprising an interaction between an agent and a customer of the organization; a text extraction step for extracting one or more test words from the test audio source; an acoustic feature extraction step for extracting one or more acoustic features from the test audio source; and an interaction classification step for applying a model to the test words and acoustic features and determining a segment in the test audio source. The method can further comprise a step of performing agent quality management using the segment. The method can further comprise a step of using the segment for one or more items selected from the group consisting of: improving text extraction; performing statistical analysis; visualization; category assignment; parts of speech extraction enhancement; interaction analysis; and new search descriptors identification. The method can further comprise a step of using the segment for one or more items selected from the group consisting of: interaction analysis; visualization; statistics; text analysis component; text mining; natural language processing; categorization; classification; root cause analysis component; reporting; and Automatic Call Distribution. Within the method, the segment is optionally selected from the group consisting of: a question; an answer; a statement; a non-verbal segment; and a street-noise segment. The method can further comprise a natural language processing step for processing the test words. Within the method, the natural language processing optionally comprises part of speech analysis for tagging the test words into a part of speech or a stemming step for stemming the at least one test word. The method can further comprise a lexical feature extraction step for extracting a lexical feature from the test words. The method can further comprise a speaker dizarization step so for segmenting the test audio source according to speaker. Within the method one or more results obtained by the interaction classification step are optionally used by one or more items selected from the group consisting of: interaction flow visualization; category assignment; text extraction improvement; new search descriptors identification; part of speech extraction enhancement step; and statistics or diagrams steps. The method can further comprise the steps of: receiving a training interaction corpus comprising one or more training audio sources; a second text extraction step for extracting one or more training words from the training audio sources; an acoustic feature extraction step for extracting one or more acoustic features from the training audio source; receiving tagging information related to the training audio sources; and a model training step for constructing the model, based on the training words, one or more acoustic features, and tagging information. The method can further comprise a second natural language processing step for processing the training words, a second lexical feature extraction step for extracting a lexical feature from the training words, or a second speaker dizarization step for segmenting the training audio source according to speaker. Within the method, the text extraction step optionally comprises speech to text, word spotting, or phonetic search. Within the method, the acoustic features are optionally selected from the group consisting of: pitch; energy; shimmer; silence; talk-over; emotion level; speech speed; speaker gender; and speaker age.

Another aspect of the disclosure relates to an apparatus for analyzing a vocal interaction between an agent and a customer of an organization captured in a test audio source, the test audio source captured within an environment, the apparatus comprising: an extraction engine for extracting one or more test words and one or more test acoustic features from the test audio source or one or more training words and one or more training acoustic features from a training audio source; a classification training engine for receiving tagging information and generating a model, the model relating between the training words and the training acoustic features, and the tagging information; and a classification engine for applying the model to the test words and the test acoustic features, thus obtaining a segment in the test audio source. Within the apparatus, the extraction engine optionally comprises a speech to text engine, a word spotting engine, or a phonetic search engine. The apparatus can further comprise a natural language processing engine for processing the test words or the training words. Within the apparatus, the natural language processing engine optionally comprises a part of speech analysis engine for tagging the test words or the training words into a part of speech, or a stemming engine for stemming the test words or the training words. Within the apparatus, each of the test acoustic features or the training acoustic features is optionally selected from the group consisting of: pitch; energy; shimmer; silence; talk-over; emotion level; speech speed; speaker gender; and speaker age. The apparatus can further comprise a textual feature definition component for defining one or more textual featured, and a textual feature extraction component for extracting one or more textual features from the test audio source or training audio source. The apparatus can further comprise a capturing or logging component for capturing the audio source, and a storage component for storing the audio source or the test words or the training words or the model. The apparatus can further comprise a quality management component for evaluating a quality parameter of the agent or an activity associated with the organization. The apparatus can further comprise one or more components selected from the group consisting of: an interaction analysis component; a visualization component; a statistics component; a text analysis component; a text mining component; a natural language processing component; a categorization component; a classification component; a root cause analysis component; a reporting component; and an Automatic Call Distribution component.

Yet another aspect of the disclosure relates to an apparatus for analyzing a vocal interaction captured in a test audio source, the test audio source captured within an environment, the apparatus comprising: a text extraction engine for extracting one or more test words from the test audio source or one or more training words from a training audio source; an acoustic feature extraction engine for extracting one or more test acoustic features from the test audio source or training acoustic features from the training audio source; a classification training engine for receiving tagging information and generating a model, the model relating between the training words and the training acoustic features, and the tagging information; a classification engine for applying the model to the test words and the test acoustic features, thus obtaining a segment in the test audio source; a capturing or logging component for capturing the test audio or the training audio source; a storage component for storing the audio source or the test words or the training words or the model; and a quality management component for evaluating a quality parameter of the agent or an activity associated with the organization.

Yet another aspect of the disclosure relates to a computer readable storage medium containing a set of instructions for a general purpose computer, the set of instructions comprising: receiving a test audio source; extracting one or more test words from the test audio source; extracting one or more test acoustic feature from the test audio source; and applying a model to the test words and test acoustic features and determining a segment in the test audio source.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

DETAILED DESCRIPTION

A method and apparatus for tagging a vocal interaction, such as an interaction captured on an audio signal with or within an organization such as a call center, a public safety center, or other environments holding a multiplicity of vocal interactions. The interaction is preferably between an agent and a customer of the organization. Sectioning an interaction can be made, for example according to sections. Sectioning and tagging an interaction enables better understanding of the flow of the interaction, thus enabling better understanding of the interaction and its context, enhancing search for particular words, visualize the call and other actions.

The method and apparatus are based on combining textual features, such as phonetic indexing or speech-to-text (S2T) outputs comprising words detected within the audio of the interaction, with acoustical or prosody features extracted from the interaction. The unique combination of textual features and acoustic features enables the detection of sections within the interaction. For example, questions are identified by a combination of question words and pitch rise towards a pause between sentences.

The method and apparatus employ a training step and training engine, at which textual and acoustic features are extracted. Using manually or otherwise tagged data indicating the sectioning of the interactions, the connection or relation between the features and the sectioning is deduced. The connection can be expressed as a statistical model, as a set of rules, as a set of examples for common words and common feature values, or the like. For example, it can be deduced that if a question word such as "what" occurs before and in proximity to a rise in the pitch, then the segment in which the word appears is a question.

Then at production time, also referred to as testing, runtime, or realtime, textual and acoustic features are extracted from an interaction, and based on the model or rule deduced during training, sectioning is determined. The sectioning, and optionally the features are stored, to be used for visualizing, quality monitoring, further analysis of the interactions or any other purpose.

Figure 1:
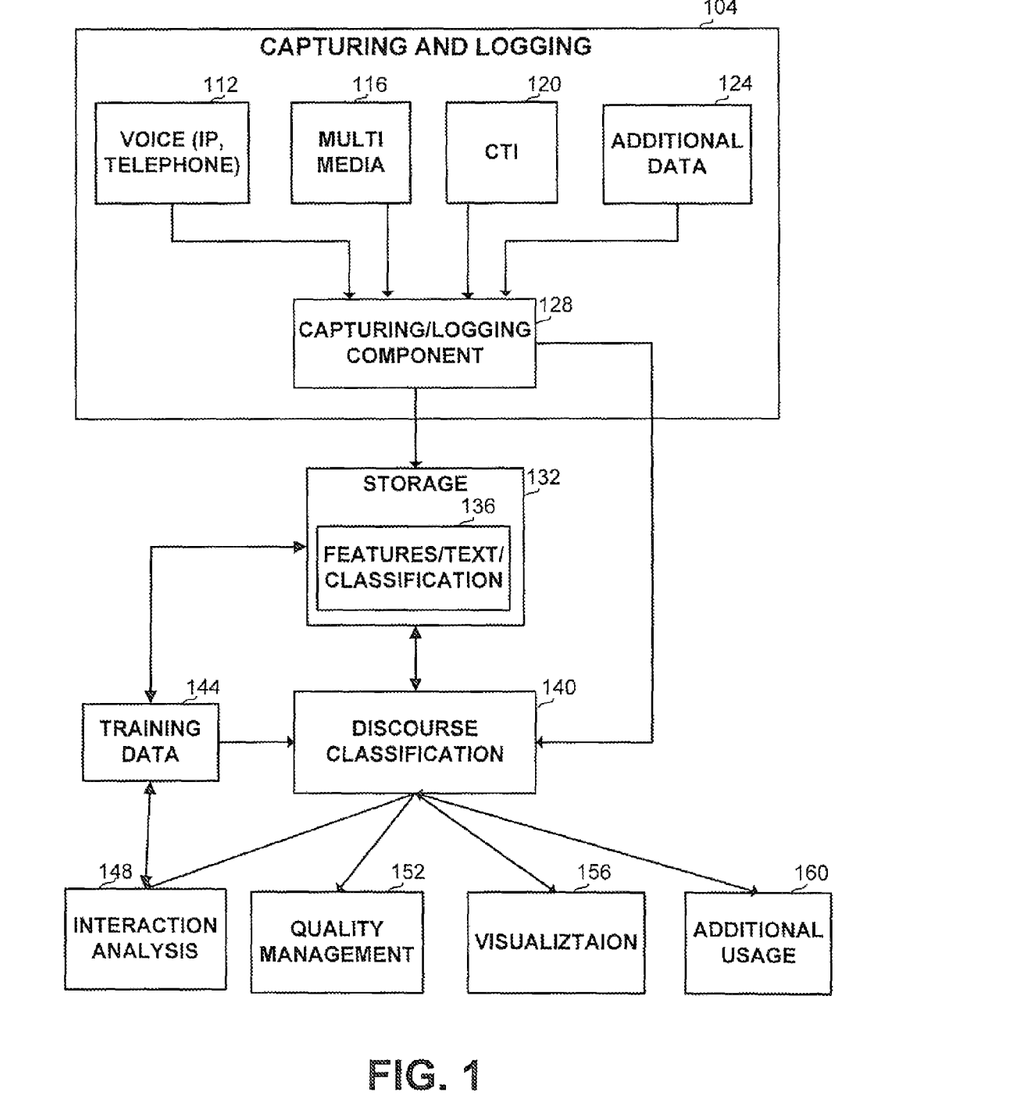
FIG. 1 is a schematic illustration of typical environment in which the disclosed invention is used.

Referring now to FIG. 1, showing a block diagram of the main components in a typical environment in which the disclosed invention is used. The environment, generally referenced as 100, is an interaction-rich organization, typically a call center of a financial institute such as a bank, a trading floor, or an insurance company, a public safety contact center, a communications service provider contact center, customer service outsourcing center or the like. Interactions with customers, users, leads, employees, business partners, or other contacts are captured, thus generating input information of various types. Each organization may comprise one or more sites, i.e. geographic locations in which interactions are handled. The information types gathered include vocal interactions, interactions comprising a vocal component, non-vocal interactions, organizational data and additional data.

Voice information source 112 optionally comprises telephone calls made using any device, such as a landline phone or a cellular phone, and transmitted using any technology, such as analog lines, voice over IP (VoIP) or others. The capturing of voice interactions can employ many forms and technologies, including trunk side, extension side, summed audio, separate audio, various encoding and decoding protocols such as G729, G726, G723.1, and the like. The voice typically passes through a PABX (not shown), which in addition to the voice of the two or more sides participating in the interaction, collects additional information discussed below. Voice information source 112 can further include face-to-face interactions, such as those recorded in a walk-in-center, and additional sources of vocal data, such as microphone, intercom, the audio part of a video capturing such as a video conference, vocal input by external systems or any other source. Another source of collected information includes multimedia information 116, which comprises interactions or parts thereof, such as video conferences, e-mails, chats, screen events including text entered by the agent, buttons pressed, field value change, mouse clicks, windows opened or closed, links to additional interactions in which one of the participants in the current interaction participated, or any other information relevant to the interaction or to the participants, which may reside within other applications or databases. In addition, the environment optionally receives Computer Telephony Integration (CTI) and PABX information 120, including start and end time, ring time, hold time, queue time, call wrap up time, number of participants stages (i.e. segments of the call during which the speakers do not change), hold time, abandon from hold, hang-up side, abandon from queue, number and length of hold periods, transfer events, number called, number called from, DNS, VDN, ANI, or the like. Any additional data 124, such as acoustic data, linguistic data, or other may also be received and stored.

Data from all the above-mentioned sources and others is captured and preferably logged by one or more capturing/logging unit 128. Capturing/logging unit 128 comprises a computing platform executing one or more computer applications as detailed below. The captured data is optionally stored in storage 132, which is preferably a mass storage device, for example an optical storage device such as a CD, a DVD, or a laser disk; a magnetic storage device such as a tape or a hard disk; a semiconductor storage device such as Flash device, memory stick, or the like. The storage can be common or separate for different types of captured interactions and different types of additional data. Alternatively, the storage can be remote from the site of capturing and can serve one or more sites of a multi-site organization. Storage 132 further optionally stores data 136 related to the sectioning, including features extracted from the interactions, including textual or acoustic features, text retrieved from the interactions, sectioning models and results or any other related data.

The data, features, parameters, or rules are transferred from storage 132 or directly from capturing/logging unit 128 without being stored, to discourse classification component 140, which receives features extracted from the interactions, and classifies the interactions according to the features, using a model. Discourse classification component 140 also performs the training, upon which classification rules or models are determined. Discourse classification component 140 is further detailed in association with FIG. 4 below. For training the model, discourse classification component 140 receives training data 140, which preferably includes classification data such as manual classification data related to the interactions processed during training. Classified or segmented training data 144 is optionally stored back on storage 132 or in any other storage.

The output of classification component 140, comprising segmented or classified interactions, optionally undergoes interaction analysis by interaction analysis component 148, during which the interaction is analyzed, for example by a supervisor or another person associated with the environment. The classification results are optionally used by quality management component 152 used for evaluating a quality parameter of a person or an activity associated with the organization, such as an agent, an interaction, a product or the like. The quality management can be automatic, manual, or a combination thereof. The quality management preferably takes into account additional information, including multimedia 116, CTI information 120, and additional data 124. The classification or segmentation can also be used by a visualization component 156, showing an interaction in a convenient manner, for example arranged as a sequence of questions and answers, according to speaker, or the like. The classification or segmentation can also be used by any additional component or system 160, such as statistics, text analysis, text mining, natural language processing, categorization, classification, root cause analysis, reporting, Automatic Call Distribution (ACD), input to service, marketing, or product departments, or the like. A person skilled in the art will appreciate that interaction analysis component 148, quality management component 152, and visualization component 156, or any combination thereof can be implemented as one or more components, modules or systems, used by the same user or users.

All components of the system, including capturing/logging components 128, discourse classification component 140, interaction analysis component 148, quality management component 152, or visualization component 156 are preferably implemented as one or more applications executed on one or more computing platforms, such as a personal computer, a mainframe computer or any other type of computing platform provisioned with a memory device (not shown), a Central Processing Unit (CPU) or microprocessor device, and one or more I/O ports (not shown). Each component is a set of logically inter-related computer programs, modules, or other units and associated data structures that interact to perform one or more specific tasks. All applications can be co-located and run on the same one or more computing platform, or on different platforms, optionally located in different geographic locations. Alternatively the components are implemented as firmware ported for a specific processor such as digital signal processor (DSP) or microcontrollers, or can be implemented as hardware or configurable hardware such as field programmable gate array (FPGA) or application specific integrated circuit (ASIC).

Figure 2:
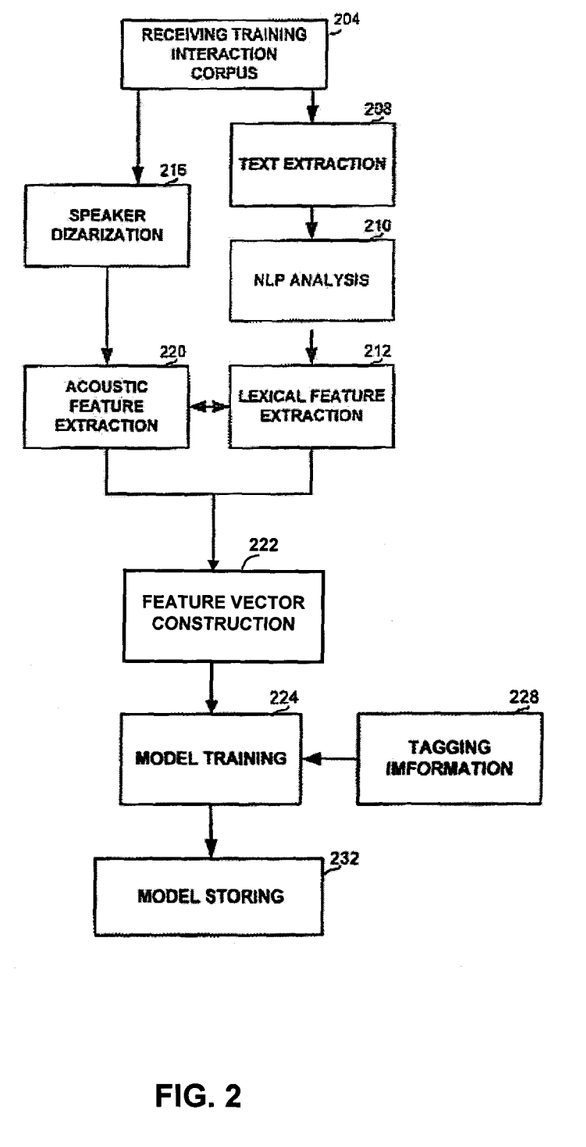
FIG. 2 is a flowchart of the main steps in training a model for discourse analysis, in accordance with a preferred implementation of the disclosure.

Referring now to FIG. 2, showing a flowchart of the main steps in training a model for discourse analysis. Training is performed on a training audio source, including interactions preferably captured within the relevant environment. On step 204 a corpus comprising one or more training audio files or streams is received by a training system, for example from the captured or logged interactions detailed in association with FIG. 1 above. The files or streams can be in any supported format, compression, of any required quantity or length, and the like.

On step 208, text is extracted from the interaction, using speech to text, word spotting, phonetic search or any other technique for extracting text from audio. Speech to text relates to transcribing the interactions as much as possible, while word spotting relates to locating particular spoken words within the interaction, wherein the words are taken from a predetermined word list. Step 208 can be performed using proprietary tools, or third party tools, such as Dragon NaturallySpeaking manufactured by Nuance (www.nuance.com). Optionally, each word or sequence of words retrieved on step 208 is associated with a confidence score.

On optional step 210, Natural language processing (NLP) analysis is performed on the retrieved text. The processing preferably includes, for example, Parts of Speech (POS) tagging, and stemming, i.e. detecting the base form of each word. NLP is preferably performed using proprietary tools, or any other external or commercial tools, such as LinguistxPlatform™ manufactured by Inxight (www.inxight.com). The POS tagging is preferably performed based on the definition as well as on the context of words, and serves for reducing ambiguity of words within the context. The tags may include a verb, a noun (singular), a noun (plural), a pronoun, a preposition, an adverb, an adjective, or others.

On step 212, textual features are extracted from the retrieved and processed text, such as words, bi-grams (2 word combinations), tri-grams (3 word combinations), keyphrases, named entities and the like.

On optional step 216, dizarization is performed on the interactions, i.e., dividing the interaction into sections according to speaker, and clustering the sections so that sections by the same speaker are in the same cluster. On step 220, acoustic features are extracted from the interactions. The features may relate to the particular interaction examined, to a speaker thereof, to the environment or to any other related factor. The features may include, but are not limited to any one or more of the following: pitch and its mathematical derivatives such as jitter, energy and its mathematical derivatives such as shimmer, silence, talk-over, emotion level, speech rate, speaker gender, speaker age, speaker idiom, or others.

On model training step 224, using tagging information received on step 228, a model is constructed, combining the textual or lexical features extracted on step 212, and the acoustic features extracted on step 220. Tagging information received on step 228 comprises manually or otherwise received class labels of the events included in the interactions corpus. In step 224 a model is trained, based upon the input training data which consists of a set of pairs, each pair comprising a feature vector constructed in step 222 and a class label indication received on step 228 is preferably performed using methods such as Neural networks, Support Vector Machines (SVM) as described for example in. "An Introduction to Support Vector Machines and other kernel-based learning methods" by Nello Cristianini and John Shawe-Taylor, Cambridge University Press, 2000, ISBN 0-521-78019-5, incorporated herein by reference, or other methods. Later, at production stage, as discussed in detail in association with FIG. 3 below, the model is used to classify segments in newly presented interactions.

The required corpus size generally depends on the training method employed. Some training methods are adaptive, i.e. new data can be used for improving the accuracy of the trained model from time to time, while others may require receiving all the corpus a-priori.

On step 232, the trained model, i.e., the statistical information yielded on training step 224 is stored in a storage device, such as storage 132 of FIG. 1.

Figure 3:
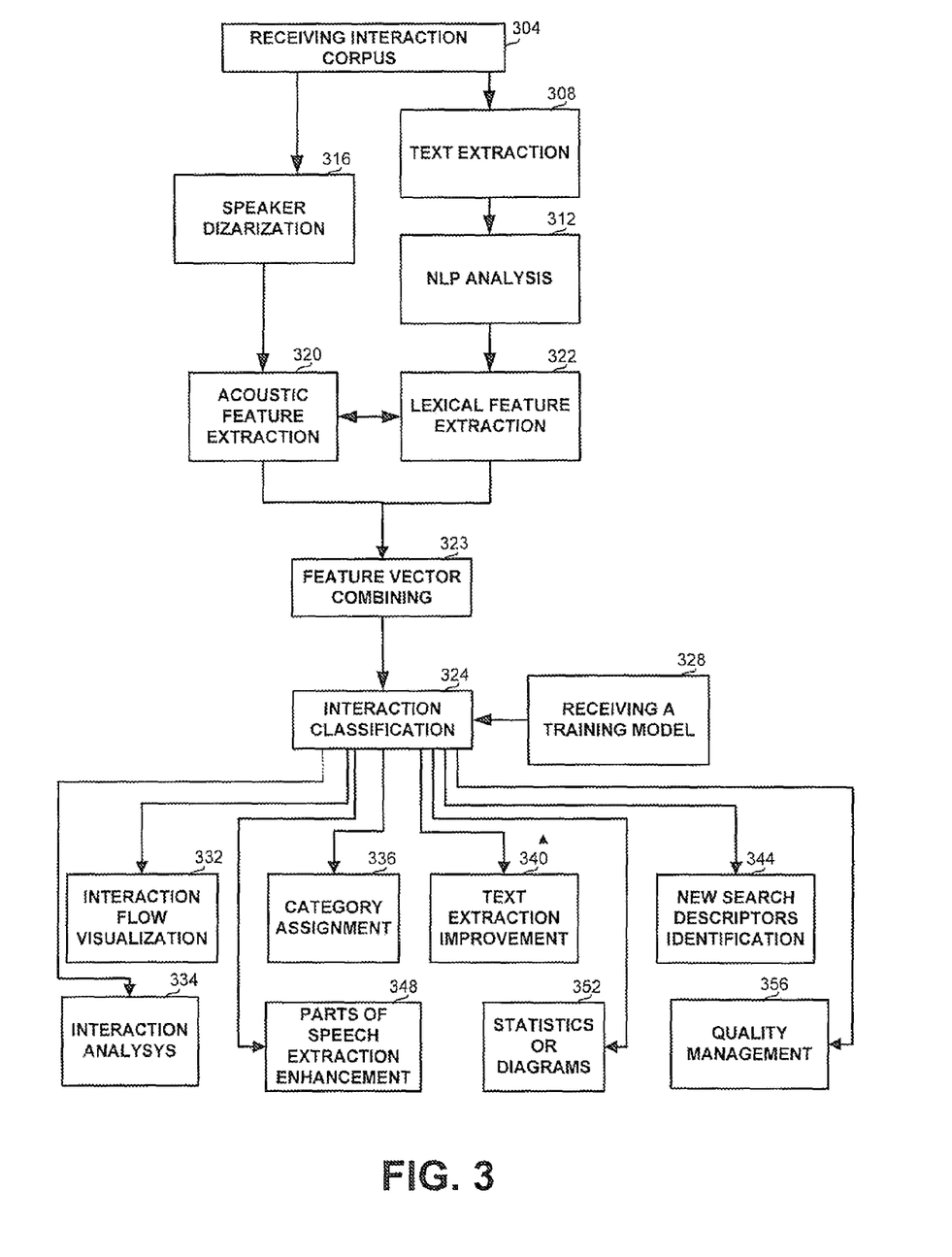
FIG. 3 is a flowchart of the main steps in performing discourse analysis, in accordance with a preferred implementation of the disclosure.

Referring now to FIG. 3, showing a flowchart of the main steps in performing discourse analysis, once training has been performed.

On step 304 a corpus comprising one or more test audio sources is received. The corpus can comprise one or more audio files or streams, such as captured vocal interactions, audio part of captured video interactions or frontal interactions, or the like. In preferred implementations, during classification, one audio source is processed at a time, so it is not required to accumulate a large corpus, but rather each audio interaction can be processed in real-time, near real-time or at any other time after it is captured. On step 308, text comprising one or more words is extracted from the interactions, using word spotting, speech to text, phonetic search or other techniques, similarly to step 208 of FIG. 2 above. On step 312 the resulting text undergoes NLP analysis, including stemming and POS tagging, similarly to step 210 of FIG. 2 detailed above.

On step 316 the interactions optionally undergo dizarization, i.e., segmentation according to speaker and clustering of segments in which the same speaker speaks, similarly to step 216 of FIG. 2 above.

On step 320, acoustic features are extracted from the interactions, similarly to step 220 of FIG. 2 above. The features may relate to the particular interaction examined, to a speaker thereof to the environment or to any other related factor. The features may include, but are not limited to any one or more of the following: pitch and its mathematical derivatives, energy and its mathematical derivatives, silence, talk-over, emotion level, speech rate, speaker gender, speaker age, speaker idiom, or others.

On step 322, lexical features are extracted from the text, similarly to step 212 of FIG. 2. Acoustic feature extraction step 320 is optionally related to lexical feature extraction step 322. It may be useful to exclude or ignore lexical features that were spotted on non-lingual segments of the interactions. On step 323, the acoustic features extracted on step 320 and the textual features extracted on step 322 are combined into one feature vector.

On step 324, interactions or sections thereof are classified, by using a trained model generated on model training step 224 of FIG. 2 and received on step 328, and the feature vector combined on step 323. Applying the model is performed by inputting the feature vector into a classifier such as an 'SVM classifier' which uses the model, and getting an output from the classifier in the form of a score that reflects the probability that the feature vector belongs to the class, such as a 'question' or another class defined within the model. In the case of SVM, the classifier determines the score according to how similar or different the current input vector is from the training examples. If the model is a Gaussian model, then the score is determined according to the probability of the input vector.

The output of interaction classification step 324 comprises segments, such as word sequences tagged as a question, an answer, or a statement; or other segments for example a segment comprising street noise can be tagged as non-verbal. The output can also comprise enhanced speaker dizarization, and other special features such as sentiment type or level.

It will be appreciated that step 324 can also use data from additional sources in order to assess the correctness of words or textual features, or for otherwise assisting in the segmentation. Such data can include but is not limited to text retrieved from e-malls, documents, prior interactions, commercial materials, or others, CTI information, or nay other data.

The output of interaction classification step 324 can be used by other steps or processes. The steps or processes include but are not limited to: interaction flow visualization step 332, in which the interaction is presented according to its segments, optionally with the available text retrieved from the interaction, for example as a divided timeline, as a sequence of lines, or in any other presentation. Other optional steps include interaction analysis 334 in which the whole interaction is analyzed, category assignment step 336, in which the interaction is assigned to one or more categories based on classification of the interaction or segments thereof. For example, negative sentiment detected on the customer side may contribute to categorizing the interaction as a "dissatisfied customer" interaction. In another example, a number of questions on the agent side exceeding the average by more than a predetermined threshold may contribute to categorizing the interaction as an "agent knowledge gaps" interaction.

Another optional step is text extraction improvement step 340 in which the classification results are used for enhancing the word spotting, speech to text, or phonetic search used on step 308. The enhancement can be, for example by updating settings or parameters related to speech recognition, such as increasing the confidence level in a question word occurring at the beginning of a question sentence. Speech to text engines typically suffer from high word error rate, which may be around 50% in call center environments. Using segment classifiers that employ textual and acoustic data may help in detecting incorrect words and perform the correction where needed.

Additional optional steps include new search descriptors identification step 344, which may be used for example to define searches for interactions that include a large number of statement events on the customer side, or for interactions in which speakers of particular gender or age group participate. Alternatively, new search descriptors identification step 344 can be used for searching for interactions comprising speech, non-speech, particular emotions, laughter, or the like.

Yet other optional steps are speech extraction enhancement step 348, used for determining parts of speech based not only on word recognition but also on the segment in which the word is said, and statistics or diagrams steps 352 for displaying statistics of multiplicity of calls, relating to detected words, classification results, and additional data, presented in textual, graphic, tabloid or other forms. For example, word distribution can be presented, combination of words and categories, or the like. Additional optional steps may also include quality management step 356 in which the performance of a person participating in the interaction, or a quality parameter of the organization is evaluated.

Figure 4:
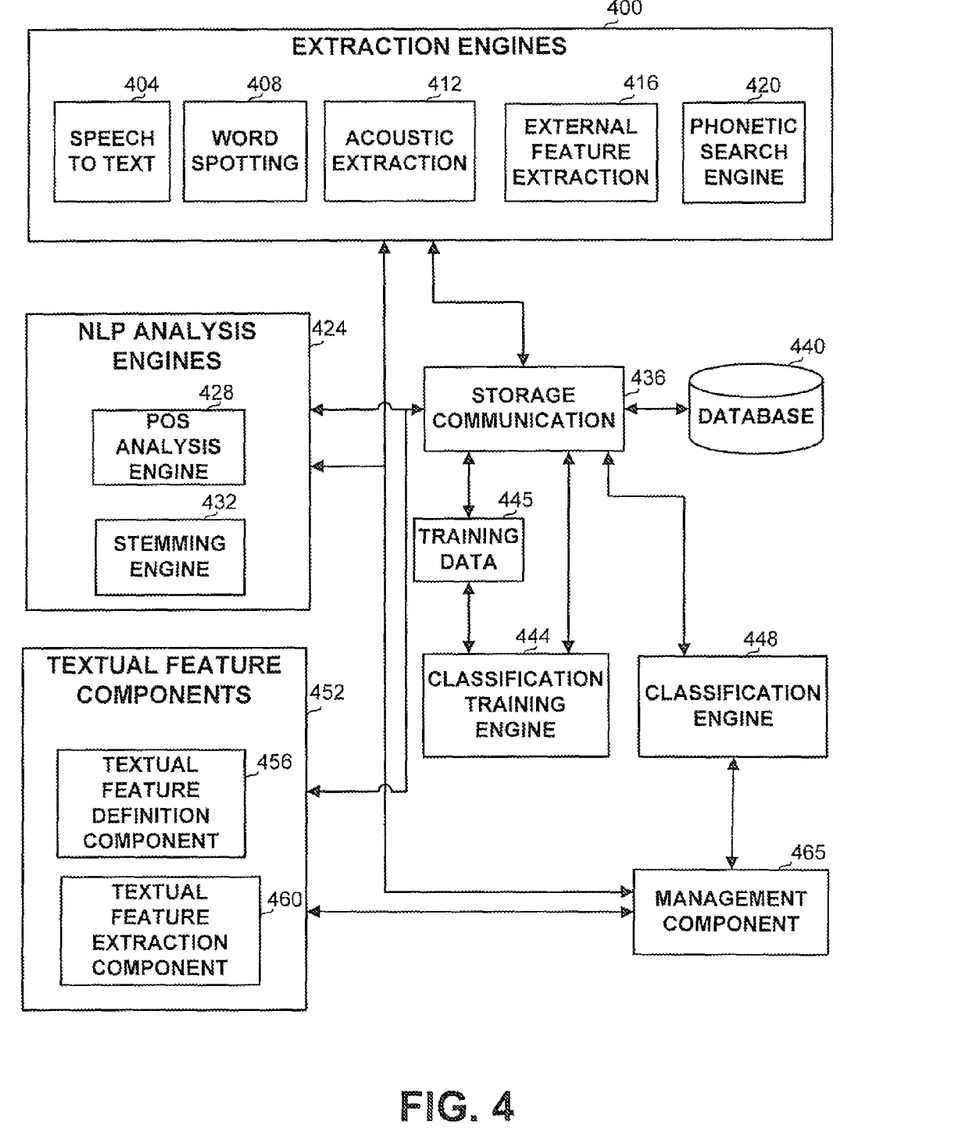
FIG. 4 is a block diagram of the main components in a discourse analysis apparatus, in accordance with preferred embodiments of the disclosure.

Referring now to FIG. 4, showing a block diagram of the main components in a preferred embodiment of a discourse analysis apparatus. The apparatus, generally shown as discourse classification component 140 of FIG. 1 is preferably implemented as interrelated sets of computer instructions performed by computing platforms, interacting to carry out the methods of FIG. 2 and. The apparatus generally comprises extraction engines 400, NLP analysis components 424, textual features components 452, discourse classification training component 444, discourse engine 448, and management component 465. Extraction engines 400 comprise at least one of speech to text engine 404, word spotting engine 408 or another engine supplying text out of audio files or streams. Extraction engines 400 optionally further comprise acoustic extraction engine 412, for retrieving acoustic features from the audio input, such as talk-over parameters, emotion indicators or other features; external feature extraction engine 416 for extracting parameters from external sources such as Computer Telephony Integration (CTI) equipment for example called number or calling number, organizational databases or other sources; and phonetic search engine 420 for locating sequences of phonemes within audio.

Natural Language Processing (NLP) tagging components 424 comprise Parts of Speech (POS) tagging engine 428 for assigning a part of speech indication, such as noun, verb, preposition, adverb, adjective or others to words extracted by engine 404 or engine 408. NLP analyses components 424 further comprise stemming engine 432 for reducing words to their basic form, for example "books" will be stemmed to "book", "going" will be stemmed to "go" and the like.

Textual feature components 452 comprise textual feature definition component 456 for defining textual features, such as questions, statements, agreements, understanding (such as "aha"), refusal (such as "uh uh" or "no no"), turn-taking, backchannel (such as "mmm" or "hmmm" sound), assessment (such as "that's great"), information request, opening statements (such as greetings), closing statements (such as farewell words), commands, surprise, or others. Textual feature components 452 further comprise textual features extraction component 460 for extracting textual features from the text output by engines 404 or 408 above, or the same text after being processes by NLP engines 424. The textual features extracted according to the rules defined using textual features definition component 456.

The apparatus further comprises or is in communication with database 440 which is a possible implementation of storage 132 of FIG. 1. Database 440 optionally comprises the interactions or the audio parts thereof, the extracted texts, textual features and acoustic features, the rules defined using component 456, and other data associated with the output or intermediate products of the apparatus. The apparatus further comprises storage communication component 436 through which the various engines communicate with database 440. In preferred implementations, such as in client-server environments, storage communication component 436 comprises units implemented as parts of database 440 and other units implemented as parts of the other components with which it communicates.

The apparatus further comprises classification training engine 444 which receives training data 445. Classification training engine 444 generates one or more models from collection of words, textual features, acoustic features extracted from training audio files or streams, and manual classification of the same interactions.

The apparatus further comprises discourse classification engine 448 for segmenting or classifying audio interactions into distinct segments, by applying the models generated by training engine 444 to data extracted from the audio files or streams, and in particular the words, textual features and acoustic features.

Preferably, the segmentation of each segment, audio file or stream, or part thereof is assigned a correctness indication. Data flow and timing within the apparatus is controlled by management component 465.

The methods and apparatus detailed above enable the segmentation or classification of audio sources into segments, for enabling better visualization, searching and enables a user to better understand the flow of the interaction, by combining textual features including words, and acoustic features. It will be appreciated that additional sources, such as Computer Telephony Integration (CTI) data, can be used for determining a particular section and a particular type, such as whether the segment is a question, a statement, or the like. Thus, for example, just before putting someone on hold, or transferring to another speaker, there is sometimes a statement such as "let me put you on hold", so that the word "hold" can be recognized. When an interaction starts, one of the words "morning", "afternoon", "evening" can usually be found according to the time the interaction occurs. Such recognitions can help determine appropriate settings for word spotting or for speech to text engines and improve the quality of the output.

It will also be appreciated that segmenting the interaction, which is enhanced by combining textual and acoustic features, can be used for multiple additional usages.

It will be appreciated by a person skilled in the art that multiple variations and options can be designed along the guidelines of the disclosed method.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step or component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method for analyzing a vocal interaction captured in an audio source, the method comprising:
   a first receiving step for receiving a test audio source from a device by a computing platform via an input port, the test audio source comprising an interaction between an agent and a customer of the organization;
   a text extraction step for extracting an at least one test word from the test audio source;
   an acoustic feature extraction step for extracting at least one acoustic feature from the test audio source;
   combining the at least one test word and the at least one acoustic feature in a feature vector; and
   an interaction classification step based on applying a model that was previously trained on a training audio corpus, the model incorporating an at least one textual feature and an at least one acoustic feature that are constructed in a training feature vector combining the at least one textual feature and the at least one acoustic feature, and tagged data that indicate how to section the interaction to the at least one test word and the at least one acoustic feature extracted from the test audio source,
   and determining a segment in the test audio source that is further classified to a class, based on the feature vector and the training feature vector, thereby obtaining a score that reflects the probability that the feature vector belongs to the class.

2. The method of claim 1 further comprising a step of performing agent quality management using the segment.

3. The method of claim 1 further comprising a step of using the segment for at least one item selected from the group consisting of: improving text extraction; performing statistical analysis; visualization; category assignment; parts of speech extraction enhancement; interaction analysis; and new search descriptors identification.

4. The method of claim 1 further comprising a step of using the segment for at least one item selected from the group consisting of: interaction analysis; visualization; statistics; natural language processing; categorization; and classification.

5. The method of claim 1 wherein the segment is selected from the group consisting of: a question; an answer; a statement; a non-verbal segment; and a street-noise segment.

6. The method of claim 1 further comprising a natural language processing step for processing the at least one test word.

7. The method of claim 6 wherein the natural language processing step comprises part of speech analysis for tagging the at least one test word into a part of speech, or a stemming step for stemming the at least one test word.

8. The method of claim 1 further comprising a textual feature extraction step for extracting a textual feature from the at least one test word.

9. The method of claim 1 further comprising a speaker dizarization step for segmenting the test audio source according to speaker.

10. The method of claim 1 wherein at least one result obtained by the interaction classification step is used by at least one item selected from the group consisting of: interaction flow visualization; category assignment; text extraction improvement; new search descriptors identification; part of speech extraction enhancement step; and statistics or diagrams steps, wherein at least one or both of text extraction improvement or part of speech extraction enhancement step comprise updating settings or parameters related to speech recognition.

11. The method of claim 1 further comprising the steps of:
   receiving a training interaction corpus comprising at least one training audio source;
   a second text extraction step for extracting an at least one training word from the at least one training audio source;
   an acoustic feature extraction step for extracting at least one acoustic feature from the training audio source;
   receiving tagging information related to an incomplete part of the at least one training audio source wherein the tagging information is based on analyzed definition and context of the at least one training word;
   combining the at least one training word and the at least one acoustic feature in a construct of a feature vector; and
   a model training step for constructing the model, based on the feature vector of the at least one training word and the at least one acoustic feature, and on the tagging information.

12. The method of claim 11 further comprising a second natural language processing step for processing the at least one training word, a second textual feature extraction step for extracting a textual feature from the at least one training word, or a second speaker dizarization step for segmenting the at least one training audio source according to speaker.

13. The method of claim 1 wherein the text extraction step comprises speech to text, word spotting, or phonetic search.

14. The method of claim 1 wherein the at least one acoustic feature is selected from the group consisting of: pitch; energy; shimmer; silence; talk-over; emotion level; speech speed; speaker gender; and speaker age.

15. An apparatus for analyzing a vocal interaction between an agent and a customer of an organization captured in a test audio source, the test audio source electronically captured within an environment as a test audio electronic signal, the apparatus comprising:

an extraction engine for electronically extracting at least one test textual word and at least one test acoustic feature from the test audio electronic signal and combining the least one test textual word and the at least one test acoustic feature in a construct of a test feature vector, or for electronically extracting at least one training textual word and at least one training acoustic feature from a training audio electronic signal and combining the at least one training textual word and the at least one training acoustic feature in a construct of a training feature vector;

a classification training engine for receiving tagging information respective to any part-of-speech (POS) in the training audio electronic signal independently of a sentence boundary that indicate how to section the vocal interaction and generating a model, the model relating between the at least one training textual word and the at least one training acoustic feature according to the training feature vector and the tagging information; and a classification engine for applying the model having the tagging information that indicate how to section the vocal interaction to the at least one test textual word and the at least one test acoustic feature according to the test feature vector, thus obtaining a segment in the test audio electronic signal, and for further classifying the segment to a class, based on the test feature vector and the training feature vector, to obtain a score that reflects the probability that the test feature vector belongs to the class.

16. The apparatus of claim 15 wherein the extraction engine comprises a speech to text engine, a word spotting engine, or a phonetic search engine.

17. The apparatus of claim 15 further comprising a natural language processing engine for processing the at least one test textual word or the at least one training textual word.

18. The apparatus of claim 17 wherein the natural language processing engine comprises a part of speech analysis engine for tagging the at least one test textual word or the at least one training textual word into a part of speech, or a stemming engine for stemming the at least one test textual word or the at least one training textual word.

19. The apparatus of claim 15 wherein the at least one test acoustic feature or the at least one training acoustic feature is selected from the group consisting of: pitch; energy; shimmer; silence; talk-over; emotion level; speech speed; speaker gender; and speaker age.

20. The apparatus of claim 15 further comprising a textual feature definition component for defining an at least one textual feature, and a textual feature extraction component for electronically extracting an at least one textual feature from the test audio electronic signal or training audio electronic signal.

21. The apparatus of claim 15 further comprising a capturing or logging component for capturing the audio electronic signal, and a storage component for storing the audio electronic signal or the at least one test textual word or the at least one training word or the model.

22. The apparatus of claim 15 further comprising a quality management component for evaluating a quality parameter of the agent or an activity associated with the organization.

23. The apparatus of claim 15 further comprising an at least one component selected from the group consisting of: an interaction analysis component; a visualization component; a statistics component; a natural language processing component; a categorization component; and a classification component.

24. An apparatus for analyzing a vocal interaction captured in a test audio source, the test audio source electronically captured within an environment as a test audio electronic signal, the apparatus comprising:

a text extraction engine for electronically extracting at least one textual test word from the test audio electronic signal or at least one training textual word from a training audio electronic signal;

an acoustic feature extraction engine for electronically extracting at least one test acoustic feature from the test audio electronic signal or at least one training acoustic feature from the training audio electronic signal;

a feature vector combining component for combining the at least one textual test word and the at least one test acoustic feature in a construct of a test feature vector, or for combining the at least one training textual word and the at least one training acoustic feature in a construct of a training feature vector;

a classification training engine for receiving tagging information respective to any part-of-speech (POS) in the training audio electronic signal independently of a sentence boundary that indicate how to section the vocal interaction and generating a model, the model relating between the at least one training textual word and the at least one training acoustic feature according to the training feature vector and the tagging information;

a classification engine for applying the model having the tagging information that indicate how to section the vocal interaction to the at least one test textual word and the at least one test acoustic feature according to the test feature vector, thus obtaining a segment in the test audio electronic signal, and for further classifying the segment to a class, based on the test feature vector and the training feature vector, to obtain a score that reflects the probability that the test feature vector belongs to the class;

a capturing or logging component for capturing the test audio or the training audio electronic signal;

a storage component for storing the audio electronic signal or the at least one test textual word or the at least one training textual word or the model; and a quality management component for evaluating a quality parameter of the agent or an activity associated with the organization.

25. A computer readable storage medium containing a set of instructions for a general purpose computer, the set of instructions comprising:

receiving a test audio source having a vocal interaction therein;

extracting an at least one test textual word from the test audio source;

extracting at least one test acoustic feature from the test audio source; and combining the at least one test word and the at least one acoustic feature in a feature vector;

applying a model, the model trained on a training audio corpus incorporating an at least one textual entity and an at least one acoustic feature that are constructed in a training feature vector combining the at least one textual feature and the at least one acoustic feature, and tagged data indicating sectioning of the interaction to the at least one test textual word and the at least one test acoustic feature extracted from the test audio source, and determining a segment in the test audio source and further classifying the test audio source to a class, based on the feature vector and the training feature vector, thereby obtaining a score that reflects the probability that the feature vector belongs to the class.

* * * * *